INVENTOR.
Hermann Alfred Otto Hofmann
By: Law and Berman
AGENTS

Sept. 2, 1969 H. A. O. HOFMANN 3,464,761
PHOTOGRAMMETRIC AFFINE PLOTTERS
Filed April 6, 1964 5 Sheets-Sheet 4

INVENTOR.
Hermann Alfred Otto Hofmann
By: Low and Berman
AGENTS

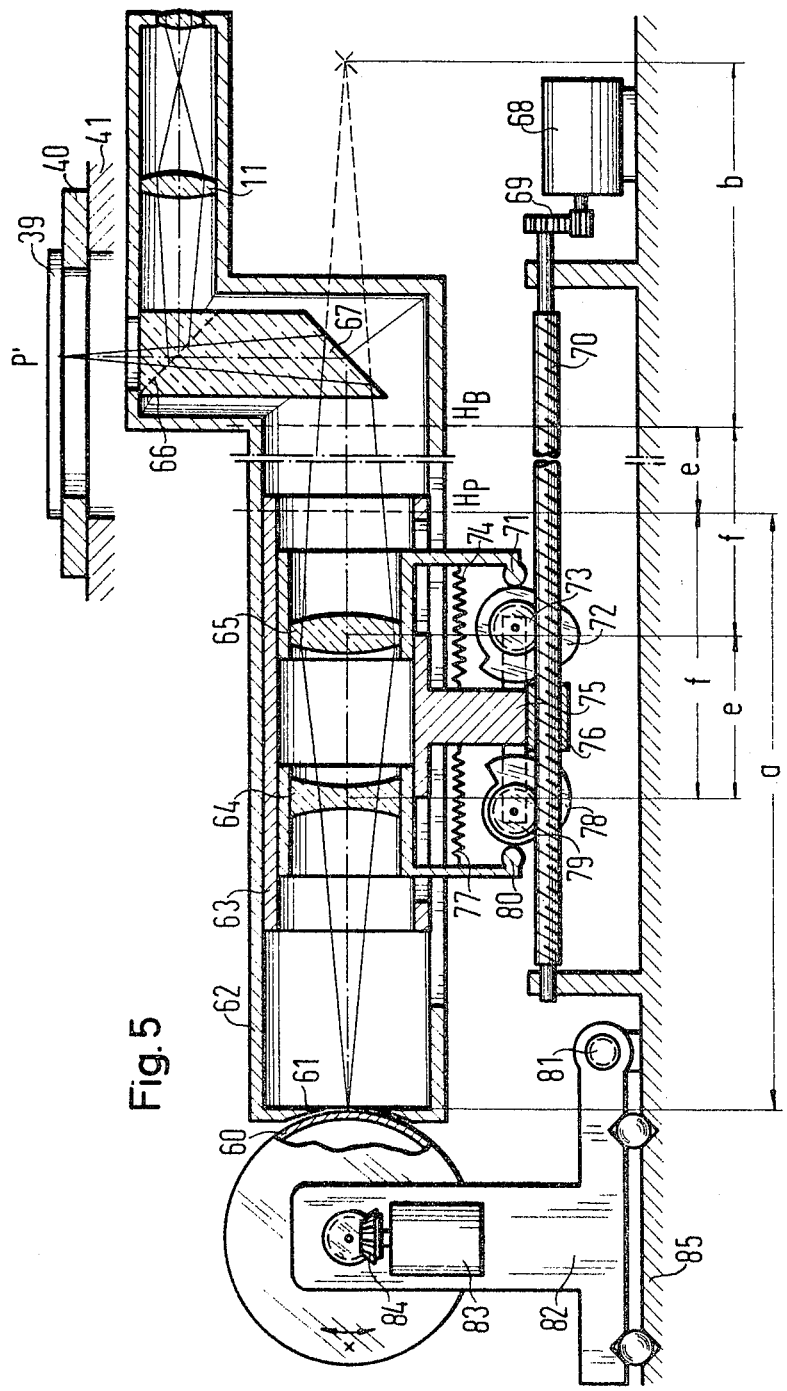

United States Patent Office 3,464,761
Patented Sept. 2, 1969

3,464,761
PHOTOGRAMMETRIC AFFINE PLOTTERS
Hermann Alfred Otto Hofmann, 4 am Hain,
Munich, Germany
Filed Apr. 6, 1964, Ser. No. 357,469
Claims priority, application Germany, Apr. 8, 1963,
H 48,790
Int. Cl. G02b 27/22
U.S. Cl. 350—136                                    10 Claims

ABSTRACT OF THE DISCLOSURE

An affine plotter has stationary binocular optical systems whose objective axes are parallel and intersect the supporting surfaces of respective image carriers in a common plane. The carriers move perpendicularly to the associated optical axis only while their supporting surfaces remain perpendicular to the optical axis and at a fixed distance from the entrance member of the associated optical system. The carriers are linked to a base carriage in such a manner that the relationships of points on photograms taken at oblique angles and supported on the carriers are converted to the corresponding relationships of photograms taken vertically when the base carriage is moved during plotting in the usual manner.

Status of technology

Figure 1:
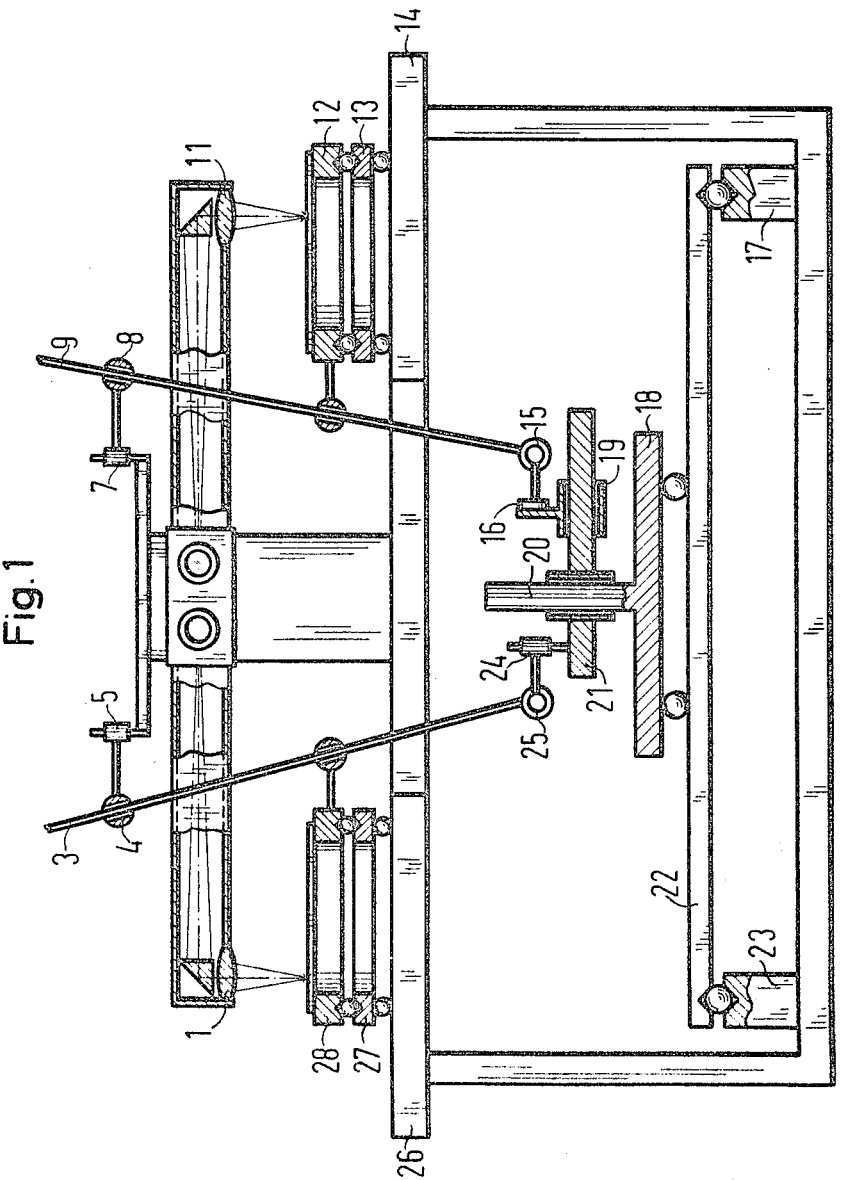

Precision stereoscopic plotting of pairs of photograms is usually performed in optical-mechanical plotters in which the photograms have the same interior and exterior orientation among themselves and with respect to the instrument axes as at the instant of exposure. In the analog method, the plotting is made by a rigorous reconstruction of the bundles of rays.

Photograms taken with extremely short focal lengths (ultrawide-angle photography) or extremely long focal lengths (narrow-angle photography) cannot be plotted at all or only with difficulty due to the large angular field in the first case and the excessive dimensions of the plotting cameras in the second case. In addition, viewing and measuring of the photograms impose rather exacting demands on the design of such equipment, since the optical measuring system must be tilted together with the photos.

In the subject invention, these difficulties are eliminated by a plotting instrument in which the photograms will always remain in a rigorously horizontal position, the plotting focal length $c'$ having a mean value which can be easily handled and which thus differs from the focal length $c$ of the aerial camera by the factor $k$, where $k \approx c'/c$. The model to be plotted as well as all vertical distances in the image and model spaces are shortened or extended by this so-called affinity factor $k$. Image tilt is correct by relatively simple mechanical correction devices and the image distances reduced to a photogram in horizontal position.

It is a particular advantage of these correction devices that they are automatically coupled in a very simple manner and do not require any additional operation as compared with the conventional orientation process.

Horizontal image carriers and the principle of affinity plotting offer the following advantages:

(1) They permit the rigorous plotting of photograms taken with any usual calibrated focal length.

(2) The horizontal position of the photograms and the horizontally moving image carriers make it possible to utilize a very simple, stationary optical system for viewing.

(3) Due to the horizontal position of the image carriers, there are no forces which would tend to deform or reduce the accuracy of the mechanical guide rods.

(4) Tiltable image carriers and the required frames and universal joints are eliminated. Instead, the image and model carriages can be moved on common horizontal guides.

(5) The devices for tilt correction cause only very small translatory motions; the respective mechanical elements can therefore be made to high precision and will yield precise corrections.

(6) The spindle drives of the correction devices are interconnected by Hooke's joints and simple gear drives, so that the spindles rotate by proportionate amounts. All correction devices are thus set simultaneously, and no additional manual and iterative settings are required as compared with conventional plotters.

(7) The correction device for image tilt can be at the same time and without any additional devices be used for correcting any systematic distortion errors of the taking lens as well as for correcting atmospheric influences and earth curvature.

(8) The permanently horizontal position of the photograms as well as the stationary viewing system permit a simple auxiliary device for orthographic projection to be attached for the differential rectification of mountainous terrain.

Description and operating principle of affine plotter

Figure 2A:
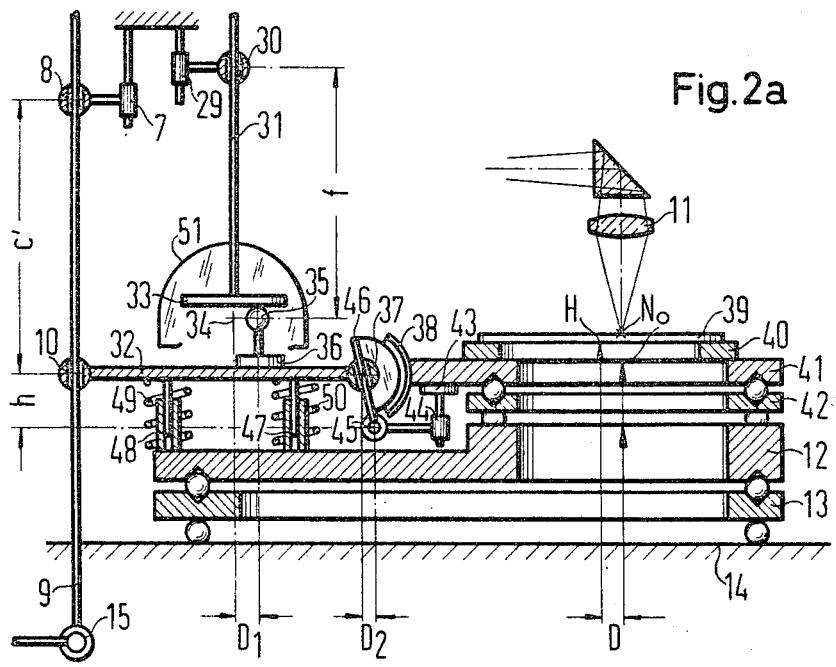
Figure 2B:
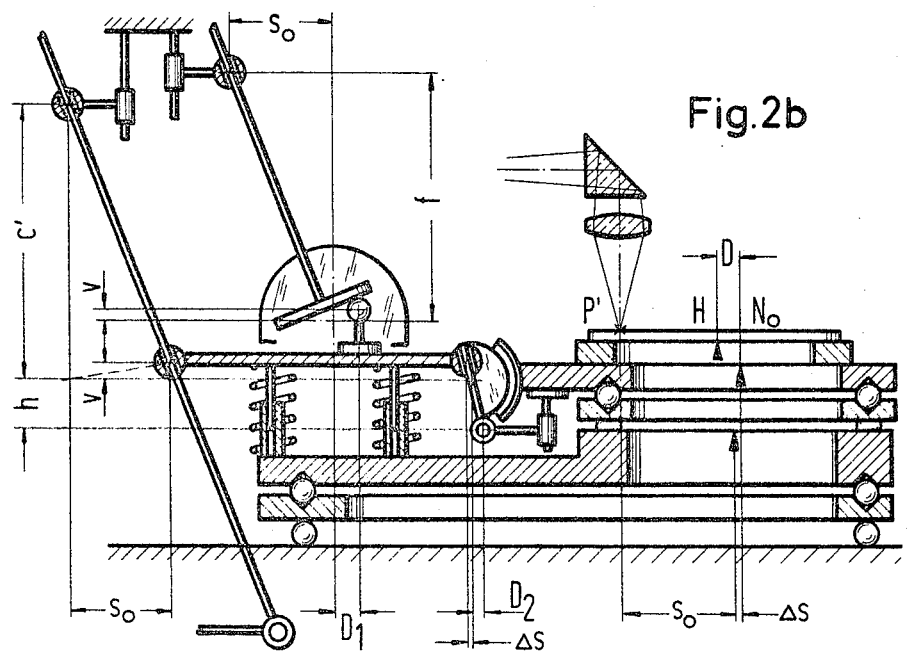
Figure 3:
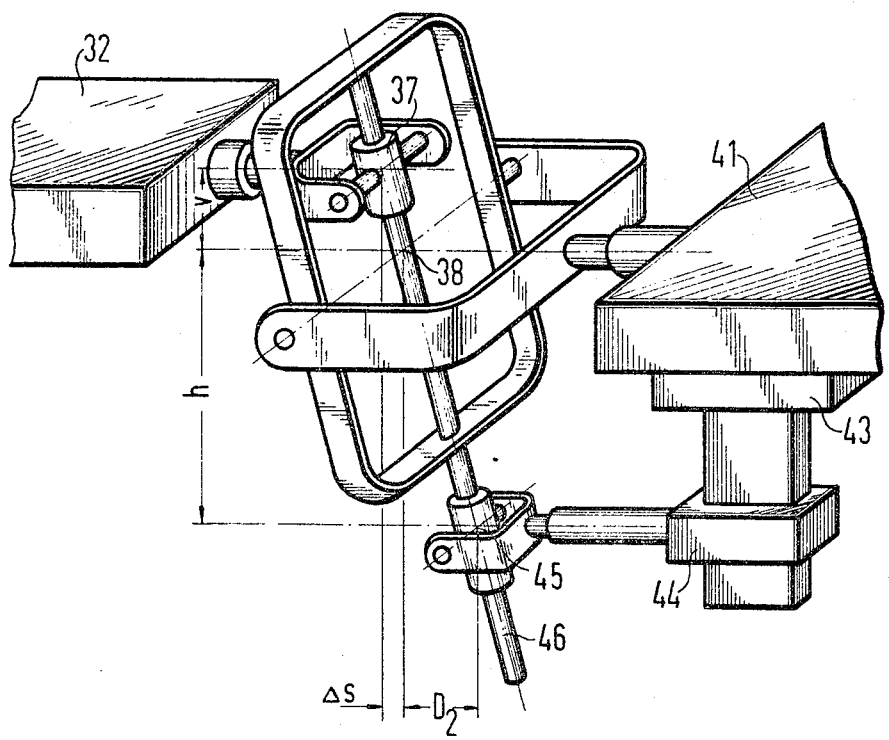
Figure 4:
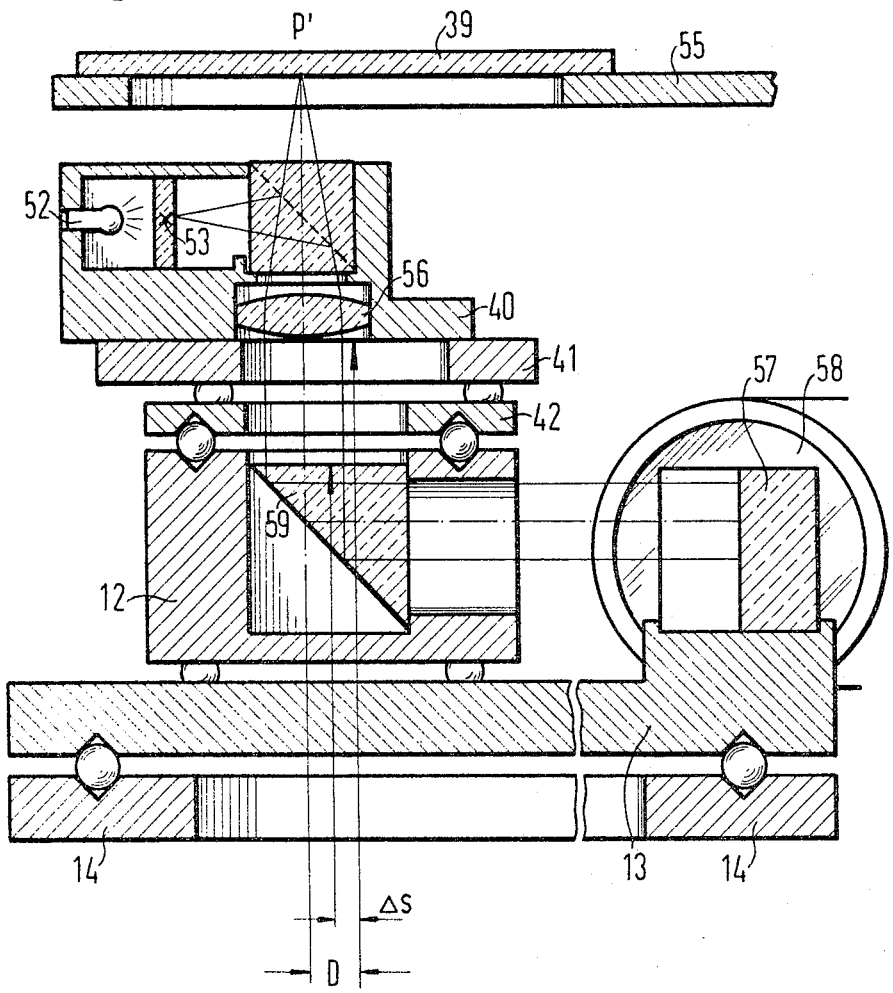

FIGURE 1 gives a schematic view of the overall design of the instrument in a section in the x–z plane. The devices for tilt correction have been omitted. Instead, they are shown in FIGURES 2a and 2b with all the parts necessary for proper functioning, as a section in the x–z plane. In FIGURES 1, 2a and 2b, the y axes of the instrument are perpendicular to the drawing plane. Universal joints and cross-slide guides have been marked by symbols. For greater clarity and easier representation, FIGURES 2a and 2b are based on the assumption that the principal section in the azimuth direction of the nadir distance coincides with the drawing plane which lies in the x–z plane of the instrument. FIGURE 2a shows the image carrier and the main guide rod in the normal or rest position. The correction devices are, however, shown in their off-center working positions. FIGURE 2b shows the image carrier moved from its rest position to the right in x direction, as well as the operation of the correction devices. FIGURE 3 gives a detailed perspective view of the double universal joints represented schematically in FIGURES 2a and 2b. FIGURE 4 shows another variant of the same basic principle, in a section in the y–z plane of the instrument. In general, only those parts of the instrument have been included in FIGURE 4, which differ from the representation in FIGURES 2a and 2b. FIGURE 5 shows the operating principle of a device for differential rectification in a section in the x–z plane.

The overall construction of the instrument corresponds to the conventional principles of a stereoscopic plotter based on mechanical projection. The $y$ carriage 22 runs on the stationary $y$ guides 17 and 23, driven either directly by hand or by rotary, non-illustrated measuring spindles. Movable in this $y$ carriage is the $x$ carriage 18 which carries the $z$ column 20 on which the base carriage 21 can be moved up and down in $z$ direction parallel to itself by means of a nonillustrated measuring spindle. The two main guide rods 3 and 9 are mounted on this base carriage by means of universal joints 15 and 25. The joint 15 can be displaced with respect to the base carriage 21 by means of the $b_y$ guide 16 in $y$ direction and by means of the $b_x$ guide 19 in $x$ direction. The joint 25 of the guide rod 3 can be displaced with respect to the base carriage 21 in $z$-direction with the aid of the $b_z$ guide 24. The $b_x$, $b_y$ and $b_z$ settings remain unchanged during plotting. The main image carriers 12 and 28 with the photograms can be displaced horizontally in the y direction on cross slides 13 and 27 and in the x direction on the stationary x guides 14 and 26. The main guide rods 3 and 9 act on image carriers through universal joints 2 and 10; they displace the image carriers with respect to the stationary optical measuring and viewing systems 1 and 11 in accordance with the three dimensional motion of the base carriage 21. Observation is made through the binocular eyepiece 6. The main guide rods pivot on normally stationary universal joints 4 and 8 which can be adjusted vertically on the supporting structure of the instrument by means of mountings 5 and 7, respectively.

The aerial photographs or other photograms to be plotted are not generally taken in a perfectly vertical direction. Consequently, the image points show a certain distortion which is corrected rigorously by the correction devices shown in FIGURES 2a and 2b. This process may be considered as a partial, mechanical rectification. As a consequence, it is possible to plot with focal lengths which deviate from the camera focal length by the factor $k$, without any errors being produced. There will only be an extension or shortening of the model in z direction by the factor $k$, as compared with the scale of the horizontal $x$–$y$ plane. The correction mechanisms operate as follows:

The main guide rod 9 acts on the main supporting carriage of the image carrier 12 via universal joint and guide sleeve 10 on a bridge 32, and the bridge 32 moves the main carriage 12 in a horizontal plane. The bridge 32 is guided vertically by guides 47 and 48 on the main supporting carriage 12. Its position in z direction is determined by an abutment head 35 and the position of a plate 33. The spherical head 35 can be displaced horizontal in x and y direction on the bridge 32 by means of a cross slide 36. The components of its distance $D_1$ from its rest position are designated $Dx_1$ and $Dy_1$. The are set parallel to the instrument's x and y axis with the aid of small spindles not illustrated which also cause movements D and $D_2$ of other elements (see below). The head 35 is moved only during the setting up process in which the two photograms on the carriers 12, 28 are positioned properly relative to the optical systems, and corresponds to tip and tilt settings on conventional instruments. During the plotting operation, the contact head 35 remains fixedly connected with the bridge 32. The abutment head 35 and the bridge 32 are pressed against the plate 33 by compression springs 49 and 50. The plate 33 is mounted for universal movement about a pivot point 34 on a support 51 of the main carriage 12. An auxiliary guide rod 31 is mounted perpendicularly on the plate 33 and is slidably received in a universal joint 30. When the carriage 12 is displaced in a horizontal direction, the auxiliary guide rod 31 will rotate around the reference point 34. Because of this tilting motion of the plate 33, the bridge 32 and the universal joint 10 are moved by the springs 49, 50 in z direction out of their normal positions. The head 35 generally is a sphere whose radius corresponds to the distance between the pivot or reference point 34 and the contact face of the plate 33. The center of the head 35 coincides with the pivot point 34 when the head is in the rest position on the bridge 32, so that $D_1=Dx_1=Dy_1=0$, which is equivalent to a nadir distance of $\nu=0$.

The vertical distance $f$ between the pivot points of the universal joint 30 and the pivot point 34 is set before the setting-operation to a value to be computed by the formula $f=u_1 \cdot c/k$ (see below) by displacing the universal joint 30 in z direction with the aid of a vertically adjustable mount 29.

The main carriage 12 runs in $y'$ direction (perpendicular to the drawing plane) on a carriage 13 which in turn runs on the $x'$ guides 14. The guides 14 are horizontal and stationary.

On the main carriage 12 there rests on balls an intermediate carriage 42 running in $x'$ direction, and on the carriage 42—likewise on balls—an intermediate carriage 41 which can be displaced in $y'$ direction and is thus capable of corrective displacements $\Delta s$ in azimuth direction of the nadir distance. These corrective displacements will generally not be greater than about 0.5 mm. The position of the intermediate carriage 41 in relation to the main carriage 12 is also determined by the bridge 32 and a small corrective rod 46. This corrective or auxiliary rod 46 is mounted on two universal joints 38 and 45 of the intermediate carriage 41. The pivot point of the joint 38 is stationary in relation to the intermediate carriage 41, while the other joint 45 can be displaced in a horizontal $x$–$y$ plane with the aid of a cross slide 43. In addition, it can be shifted by the amount $D_2$ with respect to its central or rest position, in which the guide rod 46 is vertical, the movement $D_2$ being again composed of components $Dx_2$ and $Dy_2$ which are parallel to the x and y axes of the instrument. These displacements are again achieved during the setting-up of the photograms with the aid of small measuring spindles, while the universal joint 45 and thus also the guide rod 46 will not change their position with respect to the intermediate carriage 41 during the plotting operation. Before the setting-up of the photograms, the vertical distance $h$ between the pivot points of the joints 38 and 45 is set to a precalculated value $h=2u_2 \cdot k \cdot c$ with the aid of a vertical guide 44 on which the joint 45 is mounted. A guide sleeve 37, which is mounted in a universal joint on the bridge 32 slides on the corrective rod 46. When the bridge 32 is in its rest or central position in which the main guide rod 9 and the auxiliary guide rod 31 are vertical and the head 35 is in zero position, so that $D_1=0$, the pivot points of the universal joints 37 and 38 will coincide. Thus, when the corrective rod 46 is inclined, by a shift $D_2$ of the universal joint, the bridge 32 moving up and down by the amount $v$ will thus displace the intermediate carriage 41 by the amount $\Delta s = v \cdot D_2/h$, provided that the abutment head 35 has been shifted by $D_1$ and the main carriage displaced by $s_0$ from its central position. The vertical displacement of the bridge 32 is $v=s_0 D_1/f$.

The photogram 39 lies on the supporting surface of an image carrying cross slide 40 which is offset with respect to the intermediate carriage 41 by the amount $D=\overline{HN}_0 \cdot D$ has components $Dx$ and $Dy$ in x and y direction respectively. As in the case of $D_1$ and $D_2$, it is set on measuring spindles in the course of the setting-up process. During the plotting process proper, this setting also will remain constant.

The spindles for setting $Dx$, $Dx_1$ as well as $Dy$, $Dy_1$ and $Dy_2$ are connected with each other by non-illustrated shafts and simple gear drives with the transmission ratios $u_1=Dx_1:Dx=Dy_1:Dy$ and $u_2=Dx_2:Dx=Dy_2:Dy$.

While the directions of motion for $Dx_1$ and $Dx_2$ or $Dy_1$ and $Dy_2$ are identical, $Dx$ and $Dy$ are opposed to $Dx_1$ and $Dx_2$ as well as $Dy_1$ and $Dy_2$, respectively. The transmission ratio $u_2$ is adapted to the length of the corrective rod 46. A value of $u_2=h/2c'=0.2$ or 0.25 is indicated. For the transmission ratio $u_1$, the preferred value is determined by the formula $u_1=f \cdot k/c$ in accordance with the setting ranges for $f$ and $c'$ as well as the calibrated focal length ranges $c$ to be plotted.

The corrections transforming the photogram into a perfectly vertical photograph are thus the continuous change $v$ of the focal length $c'$ used for plotting, the continuous image displacement $\Delta s$ and the constant image displacement D which is applied in the two components $Dx$ and $Dy$. Automatically coupled with this displacement D are the $D_1$ and $D_2$ which set the correction devices to the required positions for the correction of $v$ and $\Delta s$.

The photogram 39 is observed through the stationary viewing system 11 which is essentially composed of an objective, a measuring mark and an eyepiece.

While in the aforedescribed apparatus the viewing system is fixed, and the image carriers are movable, the photograms can also be arranged in a fixed horizontal position for viewing through a movable viewing system. FIGURE 4 shows such a design.

Instead of the photogram, the main carriage 12 holds the optical viewing system, with the corresponding image portion—combined with the measuring mark—being transmitted in the conventional manner to a binocular eyepiece by means of prisms and lenses.

The photogram 39 is mounted horizontally on a fixed image carrier 55. The optical system—including a measuring mark illuminator 52, the measuring mark 53, the semi-reflecting prism 54 and the objective 56—is mounted on the cross slide 40. During setting-up, it is shifted with respect to the intermediate carriage 41 by the amount D. As was explained above, the intermediate carriage 41 receives a correction $\Delta s$ with respect to the main carriage 12 through the corrective rod 46. The main carriage 12 carries a prism 59 which transmits a beam of parallel rays by means of another reflecting prism 57 on the carriage 13—to a stationary lens 58 and thence to a non-illustrated eyepiece. (In the drawing, the path of rays from prism 57 to lens 58 is perpendicular to the plane of the drawing.)

Since the rays are parallel between the movable lens 56 and the stationary objective 58, the corrective motions D and $\Delta s$ of the objective 56 which must be of a sufficiently large diameter can be carried out at right angles to the rays. At the same time, the variation in length in the direction of the optical axis, which is required for measurement, will be possible.

The measuring mark is superimposed on the image of the photogram by the semireflecting prism 54 ahead of the objective 56, so that any motion of optical elements behind that point will not give rise to measuring errors.

Additional device for the differential rectification of mountainous terrain by means of orthographic projection The permanently horizontal position of the photograms in the affine plotter permits a particularly simple differential rectification of mountainous terrain by means of orthographic projection directly in the plotting instrument. The auxiliary device employed for this purpose consists of an optical system of variable focal length which projects the portion of the photogram which is under observation in the plotter on a movable projection surface. This image is recorded photographically. During this process, the photogram and the projection surface are always perpendicular to the optical axis of the projector and are separated by a constant distance. The relative motion between the projection system and the projection surface is performed in the plane of the projection surface. It is controlled either directly or through mechanical or electrical linkages by the horizontal movement of the base carriage of the plotting instrument. The projected image section is thus true-to-scale and differentially rectified. The optical system of the projector has a variable focal length controlled by the vertical motion of the base carriage 21 in such a manner that a true-to-scale section of the photogram is focused on the projection surface. The movements of the projection system and of the projection surface are linked by transmissions, so that the optical magnification of the photogram on the projection surface is identical with the mechanical magnification ratio between the movement of the photogram carrier caused by the horizontal motion of the base carriage 21 and the motion of the projection surface. Control of the projection system is simplified if a negative and a positive lens of numerically identical, but opposite focal length are combined. The lens separation $e$, the distance $a$ between one principal plane $H_p$ and the projection surface, and the distance $b$ between the other principal plane $H_B$ and the plane of the photogram are controlled in such a manner by spindles and cam disks that the displacements of the lenses are combined of a linear portion obtained with the aid of the spindle, and a nonlinear portion obtained with the aid of the cam disks.

FIGURE 5 shows a projection device in which a photogram 39 is moved relative to the stationary measuring and viewing system 11 in a horizontal plane.

One portion of the light transmitted by the image point P' of the photogram 39 is reflected by a beam-splitting semireflecting prism 66 which is the entrance member of the viewing system 11, into the measuring and viewing optical systems and to the observer's eye.

The other portion of the light is reflected by a surface 67 of the prism 66 through an optical projection system to the cylindrical projection surface 60. The optical projection system consists of a negative lens 64 and a positive lens 65 whose centers are spaced $e$. The lenses have the same numerical focal length $f$, but of opposite sign. As a consequence, the distances $f$ between the lenses and the principal planes $H_P$ and $H_B$ of the system are constant.

Two lenses 64 and 65 can be displaced axially relative to each other in an internal tube 63 which in turn can be axially displaced within the stationary external tube 62.

The internal tube 63 with the two lenses 64 and 65 is displaced by a spindle 70 proportionally to the rotation of the spindle by means of a nut 76 on a driver 75 which projects from the tube 63 through a slot in the external tube 62. The spindle 70 is driven through a gear unit 69 by a selsyn motor 68; connected to a non-illustrated transmitter which responds the vertical motion ($z$ motion) of the base carriage 21. The two lenses 64, 65 are moved in the tube 63 by respective cam disks 72 and 78 fixedly connected with worm gears 73 and 79 in meshing engagement with the spindle 70 and by cam followers 71 and 80 on the mounts of the lenses 65 and 64 biased towards the cam disks 72 and 78 by tension springs 74 and 77.

The focused image projected on the cylindrical surface 60, is true-to-scale in accordance with the vertical setting of the base carriage 21 and is recorded photographically, its size being limited by the slit-type diaphragm 61.

The cylinder 60 is rotated on a carriage 82 by a selsyn system 83 through a gear unit 84. The selsyn motor 83 is connected to the motion of the $x$-carriage 18. The carriage 82 runs at right angles to the plane of the drawing on a stationary $y$ guide, and is driven by a spindle 81 which is coupled with the $y$ motion of the carriage 22 by means of a non-illustrated selsyn system.

During operation of the afore-described device, the model is scanned in a meandering motion with continuous readjustment in the $z$ direction, the drive motion being supplied by the base carriage. A light-sensitive photographic material mounted on the projection surface records the projected image sections continuously.

Instead of the cylindrical projection surface, a plane projection surface may also be used.

Instead of moving the cylinder past the stationary projection system, the projection system may be moved or this relative motion may be carried out by the projection surface in one direction and by the projection system in another. In this case, the variation in the length of the optical system must be made possible in the conventional manner by a parallel bundle of rays.

What I claim as my invention and desire to secure by Letters Patent is:

1. In a stereoscopic apparatus for photogrammetric evaluation of two photograms, in combination:
   (a) a normally fixed support;
   (b) two optical systems having respective entrance members (1, 11) mounted on said support, said entrance members having parallel optical axes;
   (c) two carrier members (40),
      (1) each carrier member and a respective one of said entrance members constituting a pair of members, whereby said carrier members and said entrance members constitute two pairs of members,
      (2) each carrier member defining a supporting surface perpendicular to said optical axis and axially spaced from the associated entrance member, (3) said surface being adapted to carry a photogram (39) for viewing thereof through the asciated entrance member;

(d) two guide means (12, 13, 14; 26, 27, 28) guiding respective first members of said pairs for translatory movement in two directions perpendicular to each other and to said axes while keeping the supporting surface of each carrier member perpendicular to said axis at a fixed distance from the associated entrance member, (1) said guide means each including a supporting carriage (12) movable on said support;

(e) actuating means for actuating said translatory movement of said first members, said actuating means including (1) two elongated rod members (3, 9), each rod member having three longitudinal portions, a first portion of each rod member being pivotally mounted on said support, (2) a base carriage (21) mounted on said support for movement in said two directions and in the direction of said axes, (3) pivot means (15, 25) securing respective second portions of said rod members to said base carriage, whereby angular movement of said rod members may be caused by said movement of the base carriage, and (4) two linkage means connecting respective third longitudinal portions of said rod members to said first members respectively, each linkage means including:

(i) a bridge member (32) mounted on said supporting carriage (12), (ii) engaging means (2, 10) on said bridge member engaging said third portion of the corresponding rod member, (iii) bridge guiding means guiding said bridge member for movement on said supporting carriage in the direction of said axes, said bridge guiding means including first abutment means (33) pivotally mounted on said support and having a face, second abutment means (35) on said bridge member, biasing means (47, 48) biasing said bridge member toward said first abutment means, and means (51) for keeping said face of said first abutment means at a fixed distance from a reference point (34) fixed relative to said supporting carriage during pivotal movement of said first abutment means on said support, said second abutment means including an abutment member of circular cross section in a plane transverse of said axes, said abutment member being held in engagement with said face of the first abutment means by said biasing means, and (iv) motion transmitting means connecting said bridge member to said first member for joint movement in said two directions.

2. In an apparatus as set forth in claim 1, said first member being said carrier member.

3. In an apparatus as set forth in claim 1, said first member being said entrance member.

4. In an apparatus as set forth in claim 1 adjusting means for adjusting the position of said second abutment means on said bridge member in said two directions.

5. In an apparatus as set forth in claim 1, said bridge guiding means securing each bridge member on the associated supporting carriage against movement in said two directions relative to said supporting carriage.

6. In an apparatus as set forth in claim 1, said motion transmitting means including a first universal joint on said bridge member, a second universal joint connected to said first member, and an auxiliary elongated rod member longitudinally secured to one of said universal joints and secured to the other universal joint for longitudinal movement relative thereto.

7. In an apparatus as set forth in claim 1, projection means including a projection surface and an optical system adapted to be focused on the supporting surface defined by one of said carrier members and on said projection surface for projecting an image of a photogram carried on said supporting surface on said projection surface, said optical system including lens means of variable magnification; means responsive to movement of said base carriage in the direction of said optical axes for varying the magnification of said lens means; and means responsive to movement of said base carriage in a direction perpendicular to the optical axes for displacing said projection surface at right angles relative to the direction of projection of said image on said projection surface.

8. In an apparatus as set forth in claim 7, said lens means including two lens members having a common optical axis and movable relative to each other in the direction of said common axis for varying the focal length of said lens means.

9. In an apparatus as set forth in claim 8, said lens members having the same numerical focal length, one of said lens members being negative and the other positive.

10. In an apparatus as set forth in claim 7, said projection surface being cylindrical.

References Cited

UNITED STATES PATENTS

| | | | |
|---|---|---|---|
| 2,057,921 | 10/1921 | Santoni | 350—136 |
| 2,574,123 | 11/1951 | Santoni | 350—136 |
| 2,647,317 | 8/1953 | Poivilliers | 350—136 |
| 2,785,599 | 3/1957 | Sonnberger et al. | 350—136 |
| 2,831,392 | 4/1958 | Bauersfeld et al. | |
| 2,795,046 | 6/1957 | Deker | 350—136 |
| 2,847,906 | 8/1958 | Santoni | 350—136 |
| 2,753,756 | 7/1956 | Santoni | 350—136 |
| 3,068,575 | 12/1962 | Fenske et al. | 350—136 |
| 2,387,555 | 10/1945 | Bauersfeld | 350—136 X |
| 2,647,317 | 8/1953 | Poivilliers | 350—136 X |
| 3,028,792 | 5/1962 | Krajowsky et al. | 350—41 X |

FOREIGN PATENTS

| | | |
|---|---|---|
| 384,520 | 11/1923 | Germany. |
| 424,710 | 1/1926 | Germany. |

DAVID SCHONBERG, Primary Examiner

P. R. GILLIAM, Assistant Examiner